Aug. 29, 1950 R. A. MULLANEY 2,520,251

RELAY ACTUATING DEVICE FOR AUTOMATIC PHONOGRAPHS

Filed Aug. 24, 1949

RALPH A. MULLANEY
*INVENTOR.*

BY

HIS ATTORNEY

Patented Aug. 29, 1950

2,520,251

UNITED STATES PATENT OFFICE 2,520,251

RELAY ACTUATING DEVICE FOR AUTOMATIC PHONOGRAPHS

Ralph A. Mullaney, Elmwood Park, Ill., assignor to Zenith Radio Corporation, a corporation of Illinois Application August 24, 1949, Serial No. 112,014

6 Claims. (Cl. 200—52)

This invention relates, in general, to a novel relay actuating device for a record changer and more particularly to one that is responsive to reverse movement of a tone arm for initiating a record changing cycle.

In a record player, in order that wear of the record disc grooves and of the stylus point may be minimized transducer units have been developed which may be utilized at a relatively light stylus pressure as compared with prior devices. One of the problems which arise as a result of reduced stylus pressure is that of insuring proper tracking of the stylus in the grooves. This is understandable since, as the stylus pressure is decreased, any force which impedes progress of the tone arm causes the stylus to ride up the side and slip out of the groove.

One of the forces which hinders progress of the tone arm is produced by the mechanism for initiating a record changing cycle. Prior mechanisms utilized for this purpose require a relatively heavy stylus pressure. Hence, at low stylus pressures, tracking of the stylus in the grooves is materially impaired before a sufficient force can be developed with which to actuate the initiating mechanism, and operation may be erratic.

It is an object of this invention, therefore, to provide a novel relay actuating device for a record changer which requires but a small operating force for initiating some other operating function, such as a record changing cycle.

In accordance with the invention, the relay actuating device is utilized in a record changer including a tone arm and a relay actuated control circuit. The device comprises an elongated cam track and a pendulum-like member including a contact-making portion disposed at the free end, a cam-follower portion for engaging one surface of the cam track to support the pendulum for movement therealong, and a braking portion for engaging the opposite surface of the cam track but normally maintained out of contact therewith. The actuating device also includes a first driving member actuated by the tone arm for engaging the pendulum in the vicinity of the cam-follower portion to advance the pendulum in one direction along the track when the tone arm is displaced in a given direction. The relay actuating device further includes a second driving member having a contact-making portion normally out of engagement with the contact-making portion of the pendulum. The second driving member is mechanically coupled to the tone arm so that in response to displacement of the tone arm in a direction reverse to the given direction, the second member engages the pendulum to extend the relay-circuit through both of the contact-making portions. Simultaneously the pendulum is pivoted to bring the brake portion into engagement with the cam track. Thereby, reverse movement of the pendulum along the track is impeded and firm engagement of the contact-making portions is secured.

The features of the present invention which are believed to be novel are set forth with particularity in the appended claims. The present invention itself, both as to its organization and manner of operation, together with further objects and advantages thereof may best be understood by reference to the following description taken in connection with the accompanying drawing in which:

Figures 1, 2, 3:
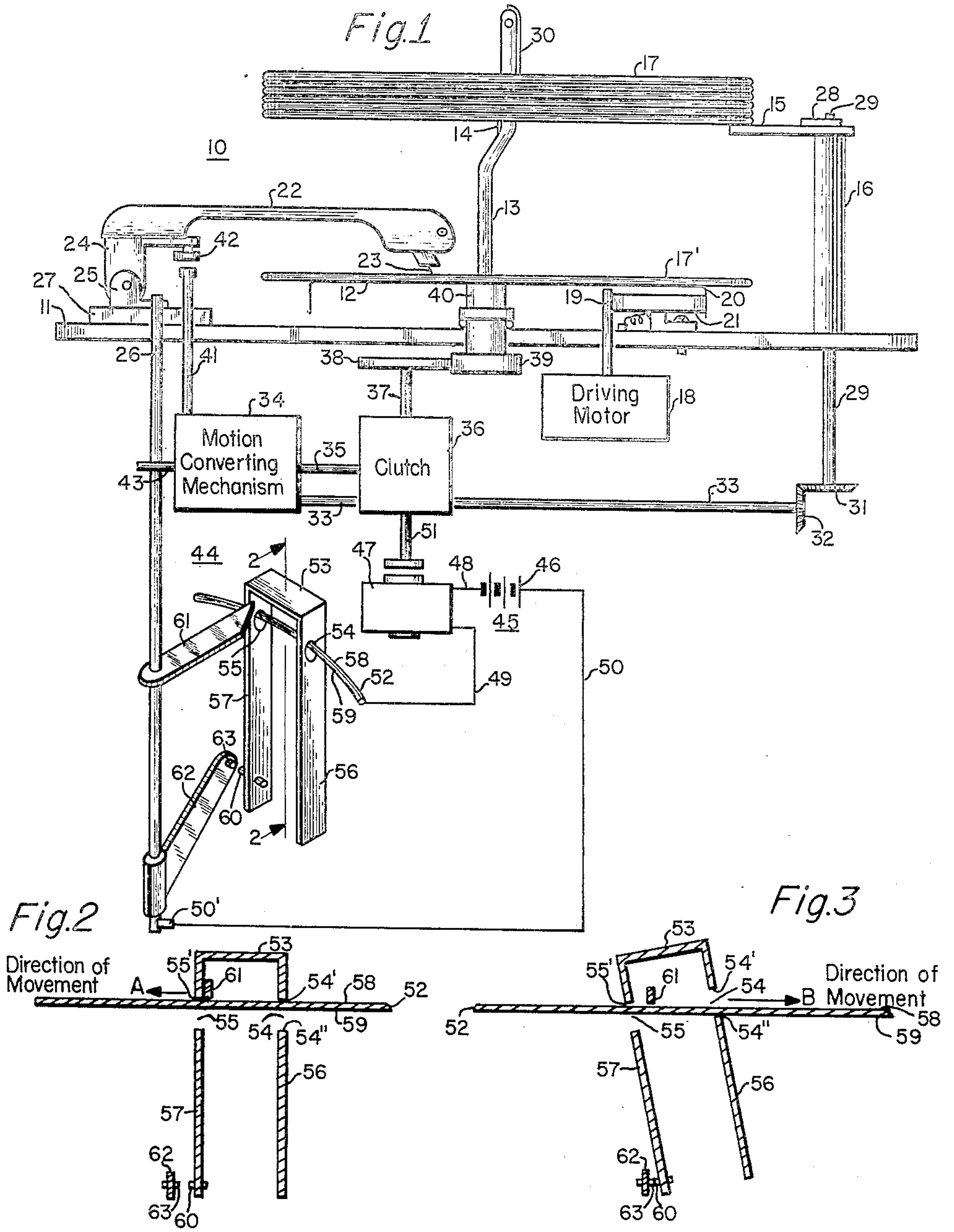
Fig. 1 is a functional diagram, partly in block, of a record changer including a relay actuating device embodying the present invention shown in perspective.
Fig. 2 is a sectional view taken along line 2—2 of Fig. 1 with one of the elements of Fig. 1 distorted and showing the relay actuating device in one condition of operation.
Fig. 3 shows the device of Fig. 2 in another condition of operation.

Referring to Fig. 1, the record changer 10, there represented, includes a mounting base 11 and a turntable 12 supported for rotation thereon. A central spindle 13 extends upwardly from turntable 12 and includes a shelf portion 14 which conjointly with a side shelf 15 supported by a side post 16 forms a record storage magazine for a stack of record discs such as 17. One of the records 17' from stack 17 is shown in position for playing on turntable 12.

A driving motor 18 having a driving shaft 19 is coupled with the inner side of rim 20 of turntable 12 through an idler gear 21. Driving motor 18 is of the synchronous, constant speed variety and the rotational speed of turntable 12 is predetermined by the diameters of shaft 19 and rim 20 in a well known manner.

A tone arm 22 having a stylus and transducer unit 23 is supported for pivotal movement about a horizontal axis by means of a hinge having companion upper and lower portions 24 and 25. Tone arm 22 further is supported for rotation about a vertical axis by means of a vertical shaft 26 affixed at one end to hinge portion 25 which rests upon a bearing block 27 secured to base member 11. Tone arm 22 thereby is supported so that the stylus of element 23 is engageable with the grooves of record disc 17' on turntable 12.

A record ejecting system includes an ejector lug 28 positioned on shelf 15. Lug 28 is affixed eccentrically to a shaft 29, rotatably supported within side post 16. The ejecting system further includes a detent element 30 of spindle 13 having an end portion (not shown) extending downwardly through the centering openings of the discs in stack 17 to the next lowermost record thereof. The mechanism, just described, is generally well known, and records may be dropped successively from stack 17 by a single rotation of shaft 29 in a conventional manner.

Shaft 29 is connected mechanically through a pair of gears 31 and 32 and through a shaft 33, to a motion-converting mechanism 34. This mechanism includes the means for converting the rotary motion of the turntable into the various movements necessary to perform a record changing cycle and its operating details will be more fully explained hereinafter. Motion-converting mechanism 34 is coupled through a shaft 35 with a clutch 36 which may be of any well known variety. Clutch 36 is connected, through a shaft 37, a driven gear 38 and a driving gear 39 in the designated order, to turntable 12 by extension 40 thereof. The clutch 36 provides a selective mechanical coupling between turntable 12 and mechanism 34.

Motion-converting mechanism 34 is coupled with an actuating bar 41 which is supported for vertical movement in the vicinity of tone arm 22 and is in incipient engagement with a projection 42 of upper hinge portion 24. Further, mechanism 34 is coupled with shaft 26 by means of a link 43. Shaft 26, in turn, is coupled with a relay actuating device 44 embodying the present invention and which will be more fully described hereinafter.

Device 44 is coupled electrically with a relay actuated control circuit 45 including a source of potential 46 connected to one terminal of a relay 47 through a conductor 48. The other terminal of relay 47 is connected to one terminal of device 44 by a conductor 49. A conductor 50 is connected to a brush contact 50' bearing upon shaft 26, which forms the other terminal of device 44, and the relay circuit is completed by the connection between conductor 50 and the potential source. Relay 47 is positioned to actuate clutch 36 by means of an actuating lever 51.

Neglecting for the moment the operation of the relay actuating device 44, the apparatus above-described comprises, in general, a conventional record changer. The operation of such a record changer is well understood so that a detailed description is unecessary. In brief, however, a record 17' is rotated for playing on turntable 12 and stylus 23 tracks in the grooves thereof. As the playing progresses, tone arm 22 is rotated about the vertical axis of shaft 26 and tone arm 22 is displaced in a given direction whereby stylus 23 progresses into the plane of the drawing of Figure 1.

Movement in the given direction continues until the eccentric grooves, positioned toward the center of the disc, are engaged by stylus 23. Such grooves impart a motion to tone arm 22 in a direction reverse to the given direction. By means of shaft 26, reverse movement is imparted to relay actuating device 44 which completes relay circuit 45 and an electromagnetic field set up by relay 47 displaces lever 51. Lever 51 actuates clutch 36 to complete a driving connection between turntable 12 and motion converting mechanism 34.

Mechanism 34 converts the rotational movement of turntable 12 into motion of the various elements as follows: Actuating bar 41 is displaced upwardly and engages projection 42 of tone arm 22 which is pivoted about the horizontal axis of hinge 24, 25 and stylus 23 is carried from engagement with the grooves of disc 17'. Link 43 is rotated and carries shaft 26 together with tone arm 22 in a rotational direction to bring the tone arm outwardly from the center of disc 17' and beyond the edge thereof. Ejector lug 28 is rotated to displace the lowermost record from stack 17 and free its centering opening from shelf 14 of spindle 13 and its outer extremity from shelf 15 to drop this disc atop disc 17'. Shaft 26 then is rotated to carry tone arm 22 to a position wherein stylus 23 is above the starting grooves of the new record and ejector lug 28 is returned to its rest position. Finally, actuating bar 41 is lowered and stylus 23 engages the starting grooves of the new record.

Referring now more particularly to that portion of Fig. 1 embodying the present invention, relay actuating device 44 comprises an elongated, arcuate cam track 52 spaced about shaft 26 and defining an arc of a circle equidistant at all points from the vertical axis thereof. Track 52 is constructed of an electrically conductive material and in a particular embodiment has a circular cross section of predetermined diameter.

A U-shaped, pendulum-like member 53 includes a pair of circular openings 54, 55 individually disposed near one end of each of leg portions 56 and 57 thereof and near the portion of pendulum 53 which connects the leg portions. Each of openings 54 and 55 has a cross-sectional diameter greater than that of track 52. As shown in Fig. 2, upper extremities 54' and 55' of openings 54 and 55 respectively, constitute a cam-follower portion of pendulum 53 for engaging the upper surface 58 of track 52 and support the pendulum for movement therealong. Since the openings are somewhat larger than the track, this sliding movement is not impaired by frictional forces if a pendulum of light weight material, such as aluminum is employed. The lower extremity 54'' of opening 54 constitutes a braking portion for engaging the opposite or lower surface 59 of cam 52 but is maintained normally out of contact therewith. Pendulum 53, being of aluminum in a particular example, is electrically conductive and includes a contact-making portion 60 disposed at the free end of leg portion 57.

A first driving member 61 is affixed to shaft 26, is rotatable with the tone arm about its vertical axis and extends from the shaft for a length substantially equal to the distance between the shaft and track 52. Driver 61 is actuated by the tone arm for engaging the pendulum 53 in the vicinity of the cam-follower portion of opening 55 at the inner side of leg portion 57. Hence, the pendulum 53 is advanced in one direction along track 52 when tone arm 22 is displaced in the given direction, with stylus 23 moving into the plane of the sheet of Fig. 1. Member 61 preferably is constructed of an electrically insulating material. An electrically conductive, second driving member 62 is affixed to shaft 26 at a distance from driver 61 approaching the length of a leg portion of pendulum 53. Driver 62 is substantially as long as driver 61, but is displaced angularly relative thereto on shaft 26. Member 62 has a contact-making portion 63 remotely positioned relative to shaft 26 and normally out of engagement with contact-making portion 60 of pendulum 53. Since driver 62 is coupled mechanically with tone arm 22, in response to displacement of the tone arm in a direction reverse to the given direction, member 62 engages, through contacts 63 and 60, the opposite side of the leg portion 57 as does member 61. Relay circuit 45 thereby is completed through track 52, pendulum 53, both of the contact-making portions 60 and 63, and member 62. Simultaneously the pendulum 53 is pivoted to bring the brake portion 54'' into engagement with surface 59 of track 52 to impede reverse movement of the pendulum along the track. This secures firm engagement of contact-making portion 60 and 63.

In Fig. 2, showing a cross-sectional view of pendulum 53, track 52 is distorted from its arcuate shape to lie in the plane of the sheet in order that an explanation of the system may be facilitated. The condition of operation here illustrated is that wherein tone arm 22 tracks in the information carrying grooves of a record being played. Since driver 61 engages leg portion 57 in the vicinity of opening 55, and leg portion 57 produces a counter turning moment, it is apparent that no turning moment, which tends to tilt the pendulum, is developed. Pendulum 53 is advanced in the direction of the arrow A along track 52 and inasmuch as member 62 rotates with tone arm 22, it is normally out of engagement with leg portion 57.

In Fig. 3 the condition of operation shown is that wherein tone arm 22 is displaced in a direction reverse to the given direction. Member 61 is removed from engagement with leg portion 57 and driver 62 is engaged with the lower extremity thereof through contact portions 60 and 63. A turning moment is produced about extremity 55' of opening 55 since the weight of leg portion 56 is not sufficient to counter the force so imposed. The pendulum 53 is pivoted about surface 55' and the lower extremity 54'' of opening 55 is carried into engagement with the lower portion 59 of cam 52. It is apparent that a brake is formed which impedes movement of pendulum 53 in the direction of arrow B. The braking is sufficient to secure firm engagement of contact portion 60 and 63 but not of a magnitude to arrest movement in the direction of arrow B.

After being initially tilted, pendulum 53 is sustained in this position throughout a record changing cycle and is carried to one end of track 52 corresponding to the position of tone arm 22 for engaging the starting grooves of a new record. As stylus 23 of tone arm 22 tracks in the grooves of the new record, driver 62 is disengaged from leg portion 57 and driver 61 is engaged therewith and the cycle aforedescribed is repeated.

As has been pointed out hereinbefore, a very small driving force is required for displacing the pendulum along the cam track. Furthermore, it may be seen that the tilting force, for the pendulum, which is applied at the lower extremity of one of the legs thereof, is applied at one end of a long lever arm and the total force required for tilting also is small. Therefore, it follows that the arrangement, just described, is a sensitive relay actuating device operative for initiating a record-changing cycle without materially impairing the tracking of a tone stylus in the grooves of a record disc.

While a particular embodiment of the present invention has been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In a record changer including a tone arm and a relay-actuated control circuit, a relay actuating device comprising: an elongated cam track; a pendulum-like member including a contact-making portion disposed at the free end, a cam-follower portion for engaging one surface of said cam track to support said pendulum for movement therealong, and a braking portion for engaging the opposite surface of said cam track but normally maintained out of contact therewith; a first driving member actuated by said tone arm for engaging said pendulum in the vicinity of said cam-follower portion to advance said pendulum in one direction along said track when said tone arm is displaced in a given direction; and a second driving member having a contact-making portion normally out of engagement with said contact-making portion of said pendulum, said second driving member being mechanically coupled to said tone arm so that in response to displacement of said tone arm in a direction reverse to said given direction said second member engages said pendulum to extend said relay circuit through both of said contact-making portions and simultaneously to pivot said pendulum to bring said brake portion into engagement with said cam track thereby to impede reverse movement of said pendulum along said track and secure firm engagement of said contact-making portions.

2. In a record changer including a tone arm rotatable about a vertical axis and a relay-actuated control circuit, a relay actuating device comprising: an elongated cam track defining an arc of a circle equidistant at all points from said vertical axis; a pendulum-like member including a contact-making portion disposed at the free end, a cam-follower portion for engaging one surface of said cam track to support said pendulum for movement therealong, and a braking portion for engaging the opposite surface of said cam track but normally maintained out of contact therewith; a first driving member rotatable with said tone arm about said axis for engaging said pendulum in the vicinity of said cam-follower portion to advance said pendulum in one direction along said track when said tone arm is displaced in a given direction; and a second driving member having a contact-making portion normally out of engagement with said contact-making portion of said pendulum, said second driving member being mechanically coupled to said tone arm so that in response to displacement of said tone arm in a direction reverse to said given direction said second member engages said pendulum to extend said relay circuit through both of said contact-making portions and simultaneously to pivot said pendulum to bring said brake portion into engagement with said cam track thereby to impede reverse movement of said pendulum along said track and secure firm engagement of said contact-making portions.

3. In a record changer including a tone arm rotatable with a vertical shaft and a relay-actuated control circuit, a relay actuating device comprising: an elongated, arcuate cam track spaced about said shaft; a pendulum-like member including a contact-making portion disposed at the free end, a cam-follower portion for engaging one surface of said cam track to support said pendulum for movement therealong, and a braking portion for engaging the opposite surface of said cam track but normally maintained out of contact therewith; a first driving member supported by said shaft for engaging said pendulum in the vicinity of said cam-follower portion to advance said pendulum in one direction along said track when said tone arm is displaced in a given direction; and a second driving member having a contact-making portion normally out of engagement with said contact-making portion of said pendulum, said second drving member being supported by said shaft but angularly displaced relative to said first driving member so that in response to displacement of said tone arm in a direction reverse to said given direction said second member engages said pendulum to extend said relay circuit through both of said contact-making portions and simultaneously to pivot said pendulum to bring said brake portion into engagement with said cam track thereby to impede reverse movement of said pendulum along said track and secure firm engagement of said contact-making portions.

4. In a record changer including a tone arm and a relay-actuated control circuit, a relay actuating device comprising: an elongated cam track having predetermined cross-sectional dimensions; a U-shaped, pendulum-like member including a pair of openings having cross-sectional dimensions larger than those of said cam track individually disposed near one end of each of the leg portions thereof, the upper extremities of said openings constituting a cam-follower portion for engaging one surface of said cam track to support said pendulum for movement therealong and the lower extremity of one of said openings forming a braking portion for engaging the opposite surface of said cam track but normally maintained out of contact therewith, and including a contact-making portion disposed at the free end of one of said leg portions; a first driving member actuated by said tone arm for engaging said pendulum in the vicinity of said cam-follower portion to advance said pendulum in one direction along said track when said tone arm is displaced in a given direction; and a second driving member having a contact-making portion normally out of engagement with said contact-making portion of said pendulum, said second driving member being mechanically coupled to said tone arm so that in response to displacement of said tone arm in a direction reverse to said given direction said second member engages said pendulum to extend said relay circuit through both of said contact-making portions and simultaneously to pivot said pendulum to bring said brake portion into engagement with said cam track thereby to impede reverse movement of said pendulum along said track and secure firm engagement of said contact-making portions.

5. In a record changer including a tone arm and a relay-actuated control circuit, a relay actuating device comprising: an elongated cam track having predetermined cross-sectional dimensions; a U-shaped, pendulum-like member including a pair of openings having cross-sectional dimensions larger than those of said cam track individually disposed near one end of each of the leg portions thereof, the upper extremities of said openings constituting a cam-follower portion for engaging one surface of said cam track to support said pendulum for movement therealong and the lower extremity of one of said openings forming a braking portion for engaging the opposite surface of said cam track but normally maintained out of contact therewith and including a contact-making portion disposed at the free end of one of said leg portions; a first driving member actuated by said tone arm for engaging said pendulum on one side of said one leg portion in the vicinity of said opening to advance said pendulum in one direction along said track when said tone arm is displaced in a given direction; and a second driving member having a contact-making portion normally out of engagement with said contact-making portion of said pendulum, said second driving member being mechanically coupled to said tone arm so that in response to displacement of said tone arm in a direction reverse to said given direction said second member engages the other side of said one leg portion to extend said relay circuit through both of said contact-making portions and simultaneously to pivot said pendulum to bring said brake portion into engagement with said cam track thereby to impede reverse movement of said pendulum along said track and secure firm engagement of said contact-making portions.

6. In a record changer including a tone arm and a relay-actuated control circuit, a relay actuating device comprising: an electrically conductive, elongated cam track; an electrically conductive, pendulum-like member including a contact-making portion disposed at the free end, a cam-follower portion for engaging one surface of said cam track to support said pendulum for movement therealong, and a braking portion for engaging the opposite surface of said cam track but normally maintained out of contact therewith; a first driving member actuated by said tone arm for engaging said pendulum in the vicinity of said cam-follower portion to advance said pendulum in one direction along said track when said tone arm is displaced in a given direction; and an electrically conductive, second driving member having a contact-making portion normally out of engagement with said contact-making portion of said pendulum, said second driving member being mechanically coupled to said tone arm so that in response to displacement of said tone arm in a direction reverse to said given direction said second member engages said pendulum to extend said relay circuit through said cam track, said pendulum, both of said contact-making portions and said second driving member and simultaneously to pivot said pendulum to bring said brake portion into engagement with said cam track thereby to impede reverse movement of said pendulum along said track and secure firm engagement of said contact-making portions.

RALPH A. MULLANEY.

No references cited.